United States Patent
Tanner et al.

(10) Patent No.: US 10,024,092 B1
(45) Date of Patent: Jul. 17, 2018

(54) 360 DEGREE DUAL PIVOT VARIABLE TORQUE HINGE MECHANISM

(71) Applicant: Google Inc., Mountain View, CA (US)

(72) Inventors: James Tanner, Los Gatos, CA (US); Lawrence James Kerila, San Jose, CA (US); Prashant Patel, Cupertino, CA (US); Lawrence Lam, San Jose, CA (US)

(73) Assignee: GOOGLE LLC, Mountain View, CA (US)

( * ) Notice: Subject to any disclaimer, the term of this patent is extended or adjusted under 35 U.S.C. 154(b) by 0 days.

(21) Appl. No.: 15/195,338

(22) Filed: Jun. 28, 2016

Related U.S. Application Data

(63) Continuation of application No. 14/539,125, filed on Nov. 12, 2014, now Pat. No. 9,411,365.

(60) Provisional application No. 61/970,618, filed on Mar. 26, 2014.

(51) Int. Cl.
 *E05D 11/08* (2006.01)
 *E05D 3/12* (2006.01)
 *G06F 1/16* (2006.01)

(52) U.S. Cl.
 CPC ............ *E05D 11/082* (2013.01); *E05D 3/12* (2013.01); *G06F 1/1618* (2013.01); *G06F 1/1681* (2013.01); *G06F 1/1683* (2013.01); *E05D 2011/085* (2013.01)

(58) Field of Classification Search
 CPC .... G06F 1/1616; G06F 1/1618; G06F 1/1681; G06F 1/1683; E05D 11/082; E05D 3/12
 USPC .......................... 361/679.26, 679.28, 679.55
 See application file for complete search history.

(56) References Cited

U.S. PATENT DOCUMENTS

| | | | | |
|---|---|---|---|---|
| 5,666,694 | A | * | 9/1997 | Slow .................... G06F 1/1618 16/308 |
| 5,751,544 | A | | 5/1998 | Song |
| 6,493,216 | B1 | | 12/2002 | Lin |
| 6,829,140 | B2 | * | 12/2004 | Shimano ................ G06F 1/162 248/919 |
| 7,155,266 | B2 | | 12/2006 | Stefansen |
| 7,345,872 | B2 | | 3/2008 | Wang |
| 7,832,056 | B2 | | 11/2010 | Kuwajima et al. |

(Continued)

FOREIGN PATENT DOCUMENTS

EP 1698156 B1 5/2011

OTHER PUBLICATIONS

"Aspire S7", retrieved on Dec. 2, 2013 from us.acer.com/ac/en/US/content/series/aspires7, 2 pages.

(Continued)

*Primary Examiner* — Anthony Haughton
(74) *Attorney, Agent, or Firm* — Brake Hughes Bellermann LLP

(57) ABSTRACT

In one general aspect, a method of coupling a base to a lid of a computing device using a hinge can include coupling a base hinge flange to the base, the base hinge flange being connected to a base hinge part that includes a knuckle including a toggle pivot, the toggle pivot coupled to and surrounding a first portion of a first shaft, and coupling a lid hinge flange to the lid, the lid hinge flange being connected to a main hinge part that includes a first cam, the lid hinge flange including a first lid main band and a second lid main band surrounding a first portion of a second shaft, the second shaft being parallel to the first shaft.

22 Claims, 13 Drawing Sheets

(56) References Cited

U.S. PATENT DOCUMENTS

| | | |
|---|---|---|
| 8,208,245 B2 | 6/2012 | Staats et al. |
| 8,395,722 B2 | 3/2013 | Mathew et al. |
| 8,474,101 B2 | 7/2013 | Zhang et al. |
| 8,627,546 B2 | 1/2014 | Zhang et al. |
| 8,776,319 B1 | 7/2014 | Chang et al. |
| 9,134,767 B2 | 9/2015 | Chen et al. |
| 9,411,365 B1 | 8/2016 | Tanner et al. |
| 2004/0155861 A1 | 8/2004 | Jackson, III |
| 2005/0162821 A1 | 7/2005 | Homer et al. |
| 2009/0000062 A1 | 1/2009 | Yamanami et al. |
| 2010/0034575 A1 | 2/2010 | Colman |
| 2011/0128688 A1 | 6/2011 | Xiao et al. |
| 2011/0265288 A1* | 11/2011 | Chiang ............... G06F 1/1681 16/341 |
| 2011/0310540 A1* | 12/2011 | Hashimoto .......... G06F 1/1681 361/679.01 |
| 2013/0016492 A1 | 1/2013 | Wang et al. |
| 2013/0135809 A1 | 5/2013 | Uchiyama et al. |
| 2013/0286578 A1 | 10/2013 | Degner et al. |
| 2013/0318746 A1 | 12/2013 | Kuramochi et al. |

OTHER PUBLICATIONS

"IdeaPad Yoga 11S: Mini Laptop", Lenovo, retrieved on Oct. 17, 2013 from http://shop.lenovo.com/us/en/laptops/ideapad/yoga/yoga-11s/, 4 pages.

Notice of Allowance for U.S. Appl. No. 14/539,125, dated Apr. 6, 2016, 15 pages.

\* cited by examiner

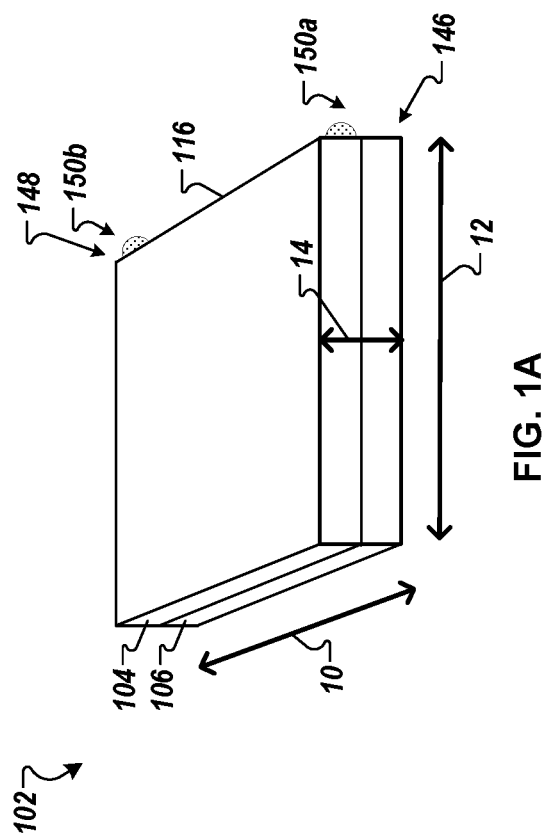

700

Coupling a base hinge flange to the base, the base hinge flange being connected to a base hinge part that includes a knuckle including a toggle pivot, the toggle pivot coupled to and surrounding a first portion of a first shaft.

702

↓

Coupling a lid hinge flange to the lid, the lid hinge flange being connected to a main hinge part that includes a first cam, the lid hinge flange including a first lid main band and a second lid main band surrounding a first portion of a second shaft, the second shaft being parallel to the first shaft.

360 DEGREE DUAL PIVOT VARIABLE TORQUE HINGE MECHANISM

CROSS-REFERENCE TO RELATED APPLICATIONS

This application claims priority to, and is a continuation of, U.S. Nonprovisional patent application Ser. No. 14/539,125, filed on Nov. 12, 2014, entitled "360 DEGREE DUAL PIVOT VARIABLE TORQUE HINGE MECHANISM", the disclosure of which is incorporated by reference herein in its entirety. This application also claims priority under 35 U.S.C. § 119(e)(1), to U.S. Provisional Application Ser. No. 61/970,618, filed on Mar. 26, 2014, the entire contents of which are incorporated herein.

TECHNICAL FIELD

This description generally relates to hinges for computing devices.

BACKGROUND

A computing device may be assembled from multiple separate parts. In addition, one or more components of the computing device may be used to attach the multiple parts of the computing device, and, in some cases, the attached parts may be moved and/or rotated with respect to one another. Example computing devices, such as laptop or notebook computers may include a lid and a base. The lid can include a display device (e.g., a touchscreen) and the base can include one or more input devices, such as a keyboard, a pointing stick, mouse buttons, a touchpad, and/or a trackpad. The lid can be attached to the base such that the lid can be moved and/or rotated with respect to the base so that the computing device can be placed into multiple positions. In order to achieve this rotation, the lid can be attached to the base using one or more moveable hinges that will allow the lid to be rotated about the base.

For example, in a closed position, the lid of the computing device is in contact with the top of the base of the computing device. In an open position, for example, where a user of the computing device can view and interact with both the touchscreen and the input devices included in the base, the lid may be placed in a stationary position and at approximately a 130-degree angle with respect to the base. In a full open position, for example, the user of the computing device may interact with the touchscreen display alone (e.g., using the computing device as a tablet). In this full open position, the lid of the computing device is in contact with the bottom of the base of the computing device. In order for a computing device to achieve all of these positions, the lid of the computing device must be able to be rotated 360 degrees.

The amount of area occupied by one or more hinges used to couple the lid of the computing device to the base of the computing device can affect the overall size (e.g., thickness) of the computing device. As computing devices become smaller and thinner, it would be beneficial if the one or more hinges used to couple the lid to the base of the computing device also could be reduced in size (e.g., diameter). In some cases, however, this may be difficult when the lid of the computing device must be able to rotate 360 degrees with respect to the base of the computing device.

A user interacting with the computing device would prefer to move the lid with respect to the base using a smooth uniform motion as opposed to multiple disjointed "jerk-like" movements. In addition, the user would like to have the selected position of the lid with respect to the base be a stable, stationary position once movement of the lid is stopped.

Thus, a need exists for systems, methods, and apparatus to address the shortfalls of present technology and to provide other new and innovative features.

SUMMARY

In one general aspect, a computing device can include a lid, and a base coupled to the lid by a hinge. The hinge can include a base hinge part including a base hinge flange and a knuckle including a toggle pivot. The toggle pivot can be coupled to and can surround a first portion of a first shaft. A main hinge part can include a first cam and a lid hinge flange including a first lid main band and a second lid main band surrounding a first portion of a second shaft. The second shaft can be parallel to the first shaft. The base hinge flange can be connected to the base. The lid hinge flange can be connected to the lid. The first cam can surround a second portion of the second shaft, the second portion being adjacent to the first portion of the second shaft. The first lid main band, the second main lid band, and the first cam can be configured to rotate about the second shaft causing the lid to rotate relative to the base. The rotation can be from a first position to a second position, and the rotation can be from a third position to a fourth position. The base hinge flange can include a first base main band and a second base main band surrounding a second portion of the first shaft. The first base main band and a second base main band can be configured to rotate about the first shaft causing the lid to rotate relative to the base, the rotation being from the second position to the third position.

Example implementations may include one or more of the following features. For instance, a main hinge torque can be associated with the main hinge part and a base hinge torque can be associated with the base hinge part. The main hinge torque can be less than the base hinge torque when the lid rotation is from the first position to the second position and from the third position to the fourth position. The main hinge torque can be greater than the base hinge torque when the lid rotation is from the second position to the third position. The computing device can further include a washer stack, and a second cam surrounding a third portion of the second shaft located between the first portion and the second portion, the second cam being located between the washer stack and the first cam. The first cam can be pushed away from the second cam when the lid is in the second position, the pushing compressing the washer stack. The washer stack can include a plurality of friction washers surrounding the second shaft and configured as a stack. A main hinge torque can be associated with the main hinge part and a base hinge torque can be associated with the base hinge part. Compressing the washer stack can increase the main hinge torque. The main hinge part can further include an end nut that surrounds a fourth portion of the second shaft. The fourth portion can be located at an end of the second shaft, the end nut retaining the washer stack on the second shaft. A diameter of the base hinge part can be less than a diameter of the main hinge part. The second shaft can be hollow. The computing device can further include a plurality of wires that pass through the second shaft. The plurality of wires can connect a first electrical component in the base of the computing device to a second electrical component in the lid of the computing device. The first electrical component can be a main logic board. The second electrical component can be one of a display, a camera sensor, a touch sensor, or an ambient light sensor. The hinge can be coupled to the base such that the base hinge part is located within a recess included in the base. The main hinge part can be located outside of the base, and horizontally offset from the base hinge part. The first position can be a position where the lid is in contact with the base. The second position can be a position where the lid is placed at an angle that is approximately 135 degrees with respect to the base. The third position can be a position where the lid is placed at an angle that is approximately 225 degrees with respect to the base. The fourth position can be a position where the lid is placed at an angle that is approximately 360 degrees with respect to the base. A torque applied to the lid by the main hinge part when the lid is rotated from the first position to the second position and when the lid is rotated from the third position to the fourth position can be substantially the same as a torque applied to the lid by the base hinge part when the lid is rotated from the second position to the third position.

In another general aspect, a method of coupling a base to a lid of a computing device using a hinge can include coupling a base hinge flange to the base, the base hinge flange being connected to a base hinge part that includes a knuckle including a toggle pivot, the toggle pivot coupled to and surrounding a first portion of a first shaft, and coupling a lid hinge flange to the lid, the lid hinge flange being connected to a main hinge part that includes a first cam, the lid hinge flange including a first lid main band and a second lid main band surrounding a first portion of a second shaft, the second shaft being parallel to the first shaft. The first cam can surround a second portion of the second shaft, the second portion being adjacent to the first portion of the second shaft. Rotating the main hinge part can cause the first lid main band, the second main lid band, and the first cam to rotate about the second shaft causing the lid to rotate relative to the base, the rotation being from a first position to a second position, and the rotation being from a third position to a fourth position. The base hinge flange can include a first base main band and a second base main band surrounding a second portion of the first shaft. Rotating the base hinge part can cause the toggle pivot to rotate causing the first base main band and a second base main band to rotate about the first shaft causing the lid to rotate relative to the base, the rotation being from the second position to the third position.

Example implementations may include one or more of the following features. For instance, a main hinge torque can be associated with the main hinge part and a base hinge torque can be associated with the base hinge part. The main hinge torque can be less than the base hinge torque when the lid rotates from the first position to the second position and from the third position to the fourth position. The main hinge torque can be greater than the base hinge torque when the lid rotates from the second position to the third position.

In another general aspect, a computing device can include a lid, and a base coupled to the lid by a dual pivot hinge. The dual pivot hinge can include a first pivot structure coupled to the lid and including a first pivot point, and a second pivot structure coupled to the base and including a second pivot point. The first pivot point and the second pivot point are spaced at a distance from one another such that the lid can clear the base when the lid is rotated relative to the base.

Example implementations may include one or more of the following features. For instance, the first pivot structure can include a friction element different from a friction element included in the second pivot structure. The first pivot structure can include a hallow shaft. The computing device can further include a plurality of wires. A diameter of the hollow shaft can be determined to allow the plurality of wires to pass through the hollow shaft. A diameter of the second pivot structure can be less than a diameter of the first pivot structure. A diameter of the first pivot structure can be different from a diameter of the second pivot structure. The first pivot structure can be horizontally offset from the second pivot structure. The dual pivot hinge can sequence the rotation of the first pivot structure and the second pivot structure when the lid is rotated relative to the base. A friction element included in the first pivot structure can be different from a friction element included in the second pivot structure.

The details of one or more implementations are set forth in the accompanying drawings and the description below. Other features will be apparent from the description and drawings, and from the claims.

BRIEF DESCRIPTION OF THE DRAWINGS

FIG. 1A is a diagram of an example computing device that includes dual pivot variable torque hinges.

FIG. 7 is a flowchart that illustrates an example method for connecting a lid of a computing device to a base of a computing device using a dual pivot variable torque hinge.

Like reference symbols in the various drawings indicate like elements.

DETAILED DESCRIPTION

In general, reducing the size and weight of a computing device can allow for the design of smaller, thinner, slimmer and more elegant enclosures. In addition, a user may utilize the computing device in different modes of operation. For example, a laptop or notebook computer that includes a touchscreen may be used in a "standard" mode. In the standard mode, a lid of the computing device can include a touchscreen and a user of the computing device can rotate the lid with respect to a base of the computing device. The user can rotate the lid to place the lid in a stationary position that is at a specific angle with respect to the base of the computing device. The user can place the base on a relatively flat stationary surface (e.g., a desktop, a lap of a user). An example of a standard mode is shown with respect to FIG. 6C, described in more detail below. In the standard mode, the user can interact with various inputs included in the base of the computing device while viewing the touchscreen. In addition, the touchscreen can receive input from the user.

The lid of the computing device may be rotated so that the back of the lid contacts the bottom of the base. This allows the computing device to be used, for example, in a tablet mode. An example of a tablet mode is shown with respect to FIG. 6F, described in more detail below.

Figure 6A:
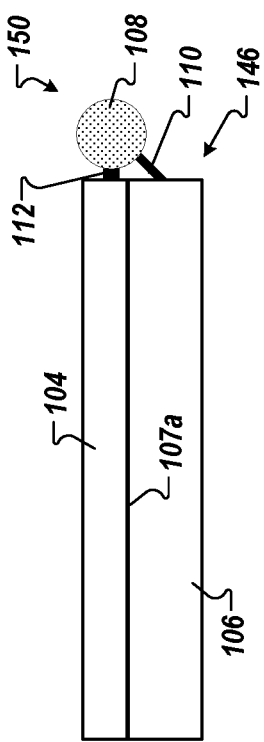
FIGS. 6A-F are diagrams that illustrate the example computing device with a lid placed at various angles with respect to a base of the computing device.

For the computing device to be used in these multiple modes, the lid of the computing device can rotate/pivot approximately 360 degrees with respect to the base of the computing device. For example, the lid can be rotated from a closed position of the computing device, where the lid contacts an upper surface of the base to a fully opened position (tablet mode), where the lid contacts a lower surface of the base. FIG. 6A and FIG. 6F, respectively, illustrate examples of these positions.

To rotate the lid approximately 360 degrees with respect to the base, the computing device includes at least two pivot points. The two pivot points are spaced a distance from one another so that the lid can clear the base when rotated. In addition, or in the alternative, the two pivot points can prevent the lid and the base from skewing as the lid is being rotated.

In some implementations, a standard dual pivot hinge can connect a lid to a base of a computing device. The use of a dual pivot hinge allows for 180 degrees of rotation about pivot points. A dual pivot hinge can include two pivot structures, which, in some implementations are the same type of structure and in other implementations are different types of structures. The diameter of each pivot structure can be the same, and a first pivot structure can be placed vertically above the second pivot structure. The first pivot structure can be coupled to the lid of the computing device and the second pivot structure can be coupled to the base of the computing device. In some cases, each pivot structure can utilize the same type of friction elements. In other cases, each pivot structure can utilize different types of friction elements. In addition, when connecting the lid to the base of the computing device, wires can be run from electronics included in the base of the computing device (e.g., a motherboard) to components included in the lid of the computing device (e.g., a touchscreen display) and vice versa. The wires can be threaded or placed along a pivot axis and may twist as the lid is rotated. As such, a pivot may include a hollow shaft for inclusion of the wires, and a diameter of the shaft is determined based on being large enough to accommodate the wires. In addition, the diameter of the pivot can further be based on the inclusion of one or more friction elements, a mounting tab, and a cosmetic cover. For example, this can result in a pivot structure that is approximately eight millimeters in diameter. To rotate the lid approximately 360 degrees with respect to the base, two such pivot structures are needed, resulting in a computing device that is approximately 16 millimeters thick.

To reduce the thickness of the computing device while allowing the lid to be rotated approximately 360 degrees with respect to the base, a dual pivot variable torque hinge can include two different diameter pivot structures (two different types of hinges) horizontally offset from one another (i.e., not vertically stacked). The two different types of pivot structures can form a dual pivot variable torque hinge mechanism that can sequence the rotation of each pivot structure (each hinge).

A first pivot structure (a main hinge) can utilize one type of friction element and can include a hollow shaft to incorporate wires running from the base of the computing device to the lid. In some implementations, a second pivot structure (a base hinge) can utilize another type of friction element, different from the friction element used in the first pivot structure. In some implementations, the second pivot structure can utilize the same type of friction element as used in the first pivot structure. The dual pivot variable torque hinge can control the sequencing of the rotation of each pivot structure while the lid is being rotated with respect to the base. The control can provide a smooth, seamless transition between the pivot structures allowing the user to experience movement of the lid as one smooth continuous motion.

This design of the dual pivot variable torque hinge utilizes a second pivot structure that has a smaller diameter than that of the first pivot structure. This can allow for a computing device that can be thinner than a computing device that incorporates a standard dual pivot hinge. The second pivot structure can be of a diameter less than the first pivot structure and since the first pivot structure and the second pivot structure are not vertically stacked, the overall thickness of the computing device can be further reduced.

FIG. 1A is a diagram of an example computing device 102 that includes dual pivot variable torque hinges 150 (where reference to dual pivot variable torque hinges 150 (without an alphabetical suffix) refers to the pair or dual pivot variable torque hinges 150a and 150b). The example computing device 102 is shown in a closed position where a lid 104 is substantially in contact with a base 106. The base 106 and the lid 104 can be attached to each other using a first dual pivot variable torque hinge 150a that is located at first end of a back 116 of the computing device 102 and a second dual pivot variable torque hinge 150b that is located at a second end of the back 116 of the computing device 102, opposite to the first end. In the example computing device 102 shown in FIG. 1A, the first end is proximate to a right side 146 of the computing device 102 and the second end is proximate to a left side 148 of the computing device 102.

Though the example computing device 102 includes two dual pivot variable torque hinges 150 located at opposite ends of the back 116 of the computing device 102, other implementations are possible. For example, the computing device 102 may be a laptop or notebook computer, or a portable phone such as a flip phone. In some implementations, a computing device may include a single dual pivot variable torque hinge, for example, when the computing device is a flip phone. In these implementations, based on the size of the computing device, a single dual pivot variable torque hinge can be used to effectively rotate a lid approximately 360 degrees from a base of the computing device.

In another example, the computing device 102 may be a laptop computer with a large, high-resolution touchscreen incorporated into the lid 104 of the computing device. The use of a high-resolution screen can make the width 10 and the length 12 of the computing device 102 (and the lid 104) large enough so that a third dual pivot variable torque hinge (e.g., located in the center of the back 116 of the computing device 102) along with dual pivot variable torque hinges 150 may be needed to effectively rotate the lid 104 approximately 360 degrees with respect to the base 106 of the computing device 102. In addition or in the alternative, the computing device 102 may include a third dual pivot variable torque hinge based on the weight of the high-resolution screen.

The descriptions of a dual pivot variable torque hinge included herein can be applied to each dual pivot variable torque hinge included in a computing device. As such, descriptions of the form and functionality of a first dual pivot variable torque hinge can be applied to a description of the form and functionality of a second dual pivot variable torque hinge (and any additional dual pivot variable torque hinges) and vice versa.

Figure 1B:
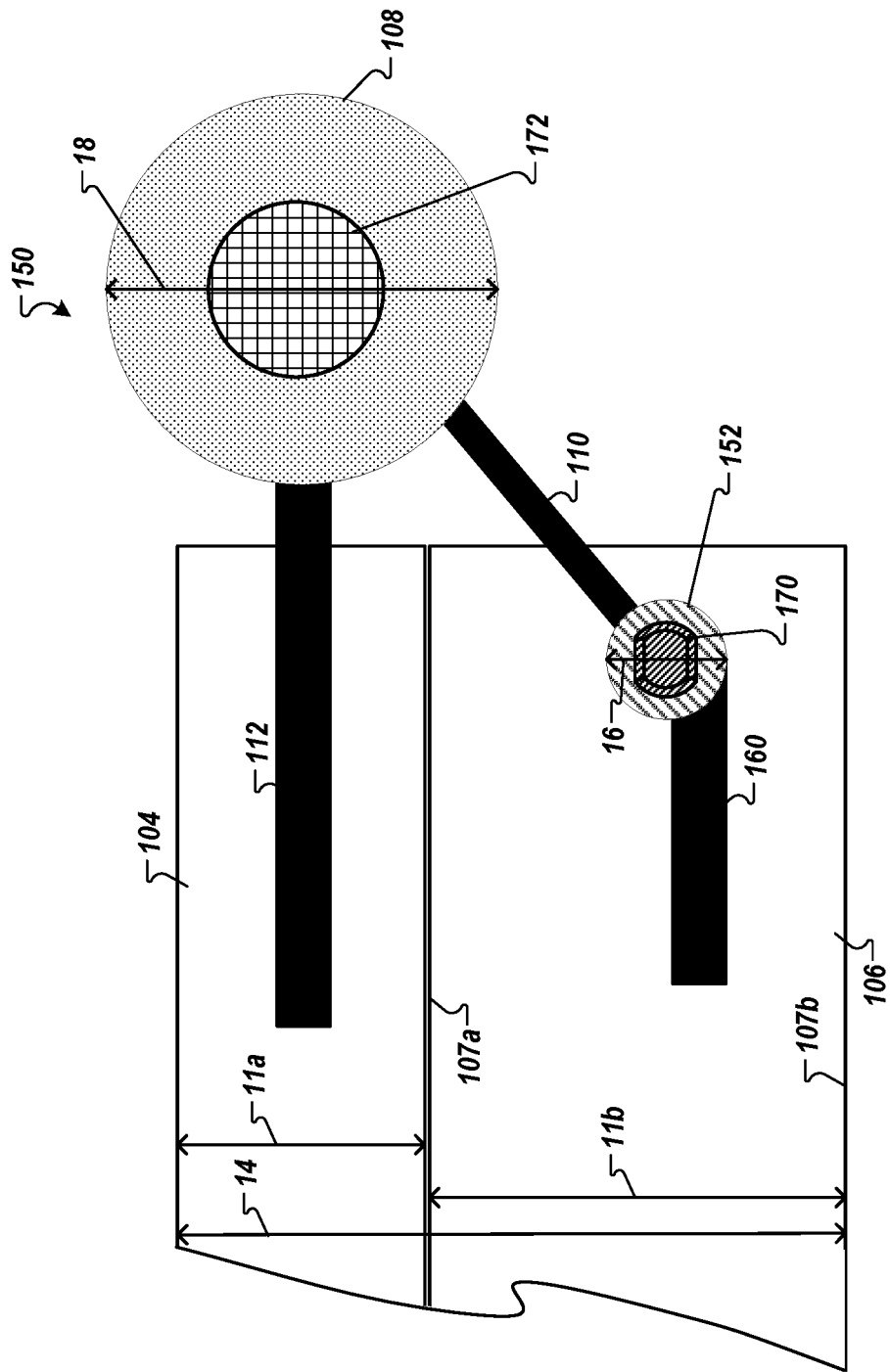
FIG. 1B is a diagram that illustrates a general side view of a dual pivot variable torque hinge showing parts that are located outside of, and inside of, a lid and a base of a computing device.
Figure 2:
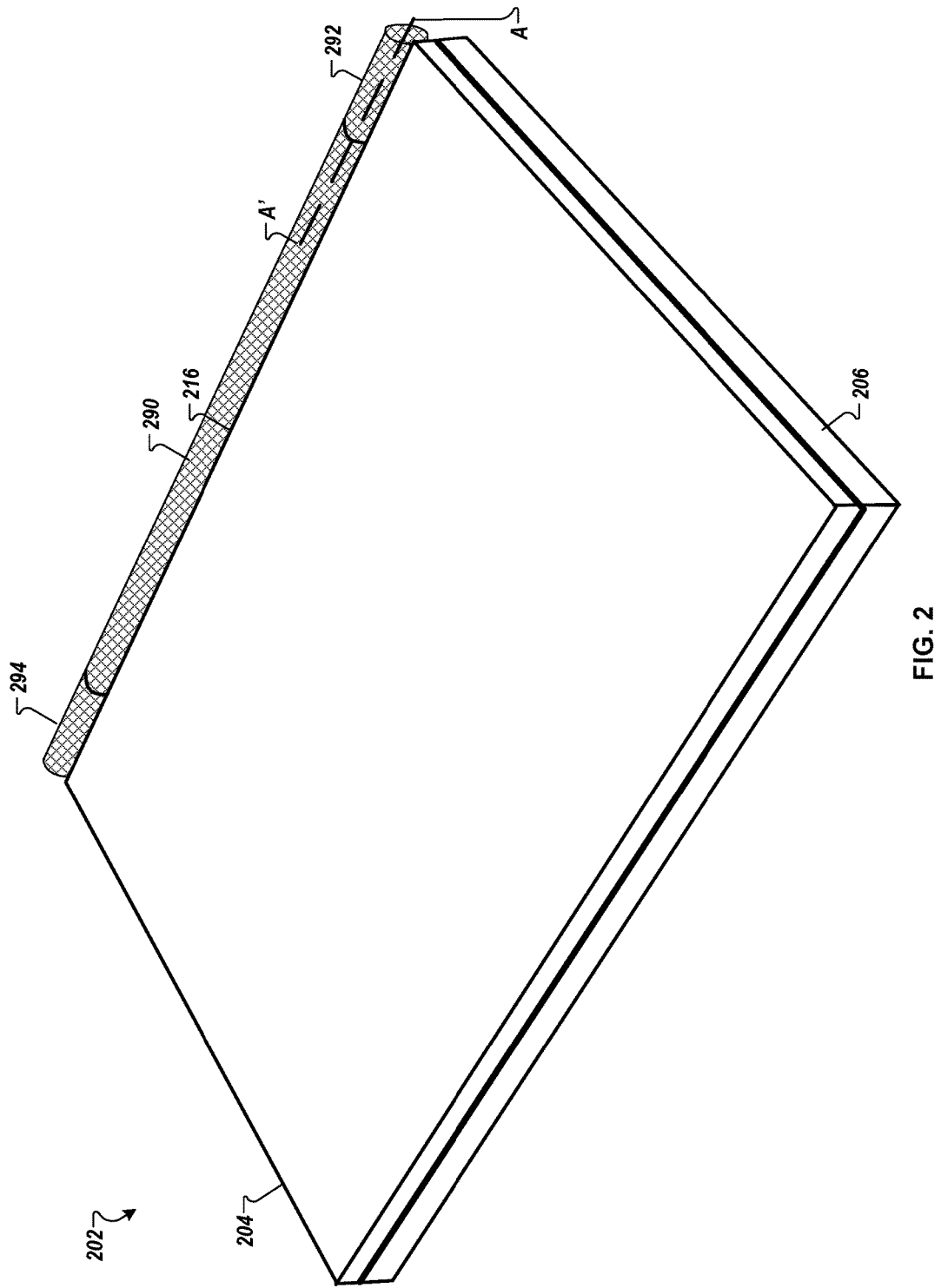
FIG. 2 is a diagram that illustrates a top view of an example computing device that includes a hinge assembly.

FIG. 1B is a diagram that illustrates a general side view of the dual pivot variable torque hinge 150 showing parts that are located outside of, and inside of, the lid 104 and the base 106 of the computing device 102. As shown in FIG. 2, part of a lid hinge flange 112 is located outside of the lid 104 and part of the lid hinge flange 112 is located inside of the lid 104. Similarly, part of a toggle neck 110 is located outside of the base 106 and part of the toggle neck 110 is located inside of the base 106. In addition, the toggle neck 110 is connected to a toggle pivot 152. The toggle pivot 152 surrounds a first shaft 170. In some implementations, the toggle pivot 152 and the first shaft 170 are located within a well included in the base 106 allowing the toggle pivot 152 to rotate/turn within the well. In some implementations, the first shaft 170 is a solid shaft. A base hinge flange 160 is coupled to the base 106 and to the first shaft 170. For example, the base hinge flange 160 can include at least one band, with a geometry similar to a question mark, which is placed over the first shaft 170. This configuration will be shown in more detail with reference to FIG. 3. Rotational movement of the toggle pivot 152 results in movement of the lid 104 of the computing device 102 at an angle relative to the base 106 of the computing device 102. In addition, rotational movement of the toggle pivot 152 rotates the first shaft 170 within the at least one band.

The lid hinge flange 112 is coupeled to the lid 104 so that rotational movement of the lid hinge flange 112 about a second shaft 172 results in movement of the lid 104 at an angle relative to the base 106.

In the example dual pivot variable torque hinge 150 shown in FIG. 1B, a diameter 16 (e.g., 0.4 millimeters (mm)) of the toggle pivot 152 is less than a diameter 18 (e.g., 0.8 mm) of the main hinge 108. In some cases, a diameter 16 of the toggle pivot 152 may be less than 0.4 mm (e.g., 0.3 mm). In some cases, a diameter 16 of the toggle pivot 152 may be greater than 0.4 mm (e.g., 0.5 mm). In some cases, a diameter 18 of the main hinge 108 may be less than 0.8 mm (e.g., 0.7 mm). In some cases, a diameter 18 of the main hinge 108 may be greater than 0.8 mm (e.g., 0.9 mm).

A thickness (height) 14 of the computing device 102 may be determined based on the size (the diameter 16) of the toggle pivot 152 included in the base 106 of the computing device 102. For example, a base thickness (height) 11b can be determined such that the toggle pivot 152 fits within the base 106 and can be rotated within the base 106. A lid thickness (height) 11a may be determined, for example, based on a size (thickness) of a display device included in the lid 104. Since the main hinge 108 is placed outside of the computing device 102, the size of the main hinge 108 (i.e., the diameter 18) does not contribute to determining the thickness of the lid 104 or the base 106. As will be described with reference to FIGS. 3-5 and 6A-F, rotational criteria for the dual pivot variable torque hinges 150 can determine a value for the diameter 18 and for the diameter 16. Keeping the diameter 16 of the toggle pivot 152 small can keep the thickness 11b of the base 106 small. This can result in a thin computing device 102 whose lid 104 can be rotated 360 degrees relative to the base 106.

In some implementations, the base thickness 11b is greater than the lid thickness 11a. In some implementations, the base thickness 11b is less than the lid thickness 11a. In some implementations, the base thickness 11b can be similar to (identical to) the lid thickness 11a.

The base 106 can be made of a rigid material, such as plastic or metal. The base 106 can include components of the computing device 102. The components can include, but are not limited to, a main logic board (MLB), a central processing unit (CPU), memory, a battery, and one or more input devices, such as a keyboard, a pointing stick, mouse buttons, a touchpad, and/or a trackpad. The base 106 can include an upper surface 107a and a lower surface 107b. The components of the computing device 102 can be positioned in an area between the upper surface 107a and the lower surface 107b. The lid 104 can include one or more components that can include, but are not limited to, a display device, one or more sensors and other devices (e.g., a liquid crystal display (LCD), a plasma display, a light-emitting diode (LED) display, a touchscreen device, a camera sensor, a touch sensor, a microphone, an ambient light sensor).

FIG. 2 is a diagram that illustrates a top view of an example computing device 202 that includes a hinge assembly (shown covered in FIG. 2). The computing device 202 can be any of the computing devices disclosed herein. The computing device 202 is shown in a closed position where a lid 204 is in contact with a top surface of a base 206. Components of the hinge assembly will be shown and described with reference to FIG. 3.

The hinge assembly is located at a back 216 of the computing device 202 and can include one or more (e.g., two) dual pivot variable torque hinges (e.g., dual pivot variable torque hinges 150 as shown in FIG. 1A) that can each be concealed/covered using a right end cover 292 and a left end cover 294, respectively. A housing 290 can conceal/cover a hollow shaft and one or more cable passageways.

Figure 3:
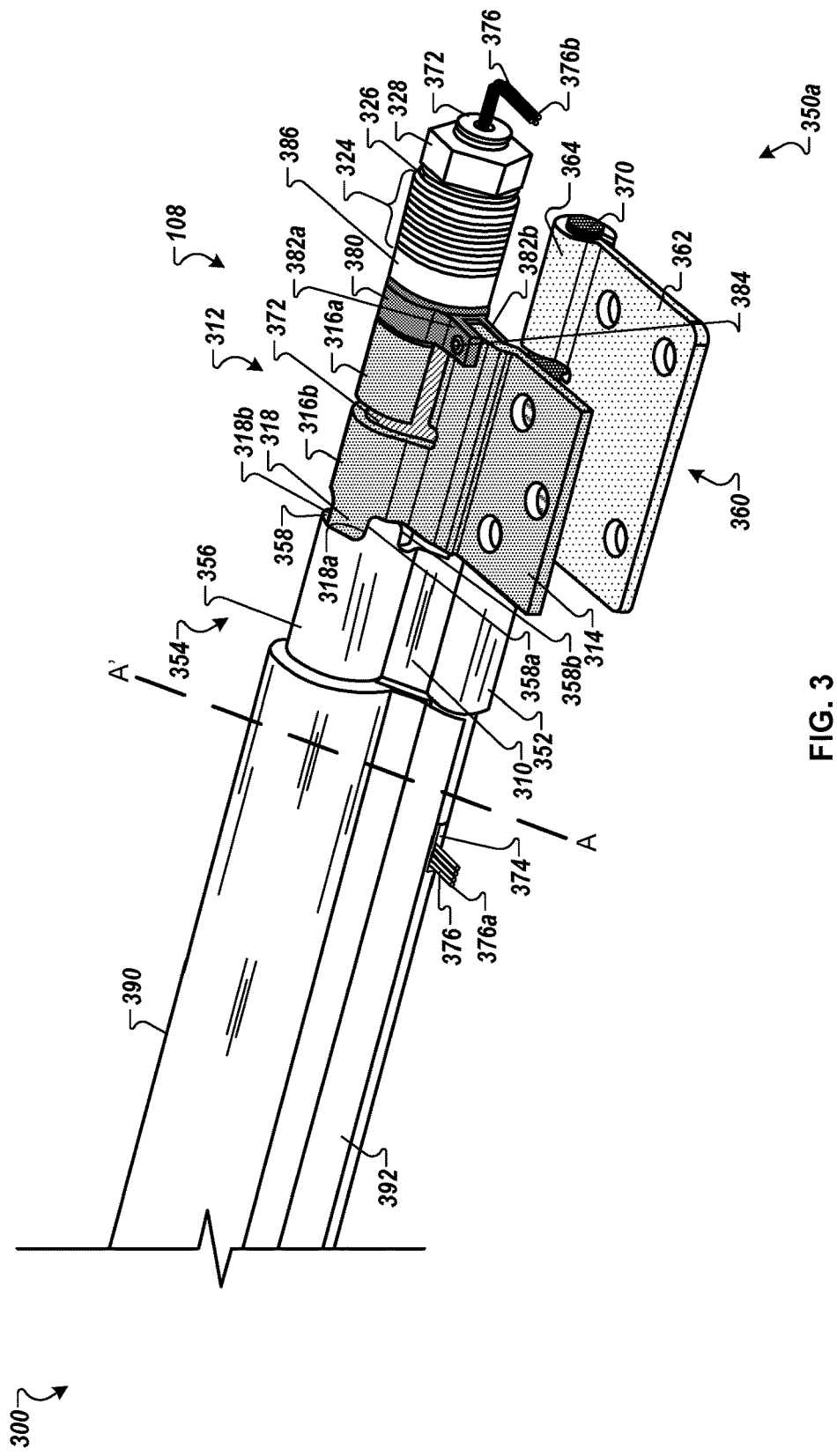
FIG. 3 is a diagram that illustrates components included in an example hinge assembly for a computing device.

FIG. 3 is a diagram that illustrates components included in an example hinge assembly 300 for a computing device (e.g., the computing devices disclosed herein). For example, the hinge assembly 300 shown in FIG. 3 will be described with reference to FIG. 1. FIG. 3 shows the components included in an example dual pivot variable torque hinge 350a (e.g., dual pivot variable torque hinge 150a located on the right side 146 of computing device 102). In addition, FIG. 3 shows a housing 390 that conceals/covers a second shaft 372. The housing 390 can include a housing neck 392. The housing neck 392 can include one or more cable passageways (e.g., cable passageway 374). Though not shown in FIG. 3, another dual pivot variable torque hinge can be located opposite to the dual pivot variable torque hinge 350a (e.g., dual pivot variable torque hinge 150b located on the left side 148 of computing device 102).

In the example shown in FIG. 3, the cable passageway 374 allows cable wires 376 to pass through the cable passageway 374 from a base of a computing device (e.g., the base 106 of the computing device 102) to a lid of a computing device (e.g., the lid 104 of the computing device 102). The cables wires 376 pass through the cable passageway 374, and through the second shaft 372, which is hollow. Though FIG. 3 shows cable wires 376, in some implementations, multiple bundles of cable wires (e.g., two or more) can be run from a base of a computing device, through the one or more cable passageways, and through the second shaft 372 to a lid of the computing device.

The cable wires 376 can serve as electronic communication mediums for different electrical components included in a computing device. The cable wires 376 can connect, at one end (e.g., cable end 376a), to electrical components included in the base of the computing device. The cable wires 376 can also connect at another end (e.g., cable end 376b) to electrical components included in the lid of the computing device. In some implementations, the cable wires 376 can be ribbon cables that include a plurality of separate wires. In some implementations, the cable wires 376 can be individual wires that may be bundled or otherwise tied together to form a cable.

A knuckle 354 includes a toggle pivot 352 (e.g., toggle pivot 152), a toggle neck 310 (e.g., toggle neck 110), and a casing 356. The casing 356 surrounds a portion of the second shaft 372. In some implementations, the second shaft 372 can run along the back (rear) of the computing device, where components included in dual pivot variable torque hinges located on each end of the computing device can be coupled to, interface with, or surround the second shaft 372. In some implementations, the second shaft 372 may run along part of the back of the computing device (e.g., the right side/end). Another second shaft can be included on the other end of the computing device. Another dual pivot variable torque hinge can also be located on the other end of the computing device. The other second shaft may run along another part of the back of the computing device (e.g., the left side/end).

The toggle pivot 352 is operatively coupled to a first shaft 370 such that rotation of the toggle pivot 352 also results in rotation of the first shaft 370.

A lid hinge flange 312 includes a lid mounting tab 314 and lid main bands 316a-b (first lid main band 316a and second lid main band 316b). Each lid main band 316a-b can have a geometry similar to a question mark—i.e., having a profile with first section that is part of a circle (e.g., more than 180 degrees, but less than 360 degrees, of the circle) connected to a straight section at an end of the first section. Each lid main band 316a-b is placed over/surrounds a portion of the second shaft 372. In the example shown in FIG. 3, the lid main band 316a has a geometry similar to a question mark and is placed over/surrounds the second shaft 372, where the placement of the first lid main band 316a results in the question mark geometry being placed over/surrounding the second shaft 372 in a counterclockwise direction. In the example shown in FIG. 3, the second lid main band 316b also has a geometry similar to a question mark and is placed over/surrounds the second shaft 372, where the placement of the first lid main band 316a results in the question mark geometry being placed over/surrounding the second shaft 372 in a clockwise direction.

The lid mounting tab 314 can be coupled to/connected to a lid of a computing device (e.g., lid 104 of computing device 102). In some cases, a torque applied to the lid of the computing device by a user of the computing device can cause the lid main bands 316a-b to rotate about the second shaft 372. The rotation of the lid main bands 316a-b causes the lid of the computing device to rotate with respect to the base of the computing device (e.g., base 106 of computing device 102).

The main hinge 108 can be implemented using constant friction hinges (e.g., question mark style hinges) providing smooth movement of the hinges that translates to smooth movement of the lid 104. The constant friction hinges can be implemented to provide sufficient friction to allow the lid 104 to remain stable in positions between the closed position and the 135-degree position (and between the 225-degree position and the 360-degree position). In some implementations, other types of constant friction hinges may be used (e.g., washer style constant friction hinges).

A first cam 380 surrounds a portion of the second shaft 372 and is coupled to/attached to the lid hinge flange 312 (and specifically the lid mounting tab 314) using two tabs 382a-b that extend out from the first cam 380. A portion of the lid mounting tab 314 is located between the two tabs 382a-b. A rivet pin 384 placed through openings/holes in the two tabs 382a-b and the lid mounting tab 314 connects/couples the first cam 380 to the lid hinge flange 312. A second cam 386 surrounds a portion of the second shaft 372. One side/edge/end of the second cam 386 is adjacent to a side/edge/end of the first cam 380. Another side/edge/end of the second cam 386 is adjacent to a plurality of washers included in a washer stack 324. In some implementations, the washer stack 324 can be a wave spring. The washer stack 324 can provide additional variable friction to the main hinge 108. The first cam 380 and the second cam 386 can control the compression of the washer stack 324, affecting the friction of the main hinge 108 and the torque that must be applied to move the main hinge 108. For example, further compressing the washer stack 324 can increase the torque that must be applied to move the main hinge 108.

The washer stack 324 is adjacent to an end nut 328 on a side/end/edge of the washer stack 324 opposite to the side/end/edge that is adjacent to the second cam 386. The end nut 328, which is internally threaded, surrounds a portion of the second shaft 372 that is externally threaded. In the example shown in FIG. 3, the internal threads of the end nut 328 can be placed within the external threads of the portion of the second shaft 372. Rotation of the end nut 328 can move the end nut 328 along the second shaft 372 and towards the washer stack 324. The washer stack 324 is placed/captured between the second cam 386 and the end nut 328, where the end nut 328 acts as a retainer of the washer stack 324. A washer 326 can be placed between the washer stack 324 and the end nut 328. The washer 326 can act as a buffer between the end nut 328 and the washer stack 324.

The lid hinge flange 312, the first cam 380, the second cam 386, the washer stack 324, the washer 326, and the end nut 328 can be considered the parts/components for a main hinge (e.g., the main hinge 108). The main hinge 108 can be implemented as a friction hinge allowing movement and placement of the lid 104 in static positions.

A base hinge flange 360 includes a base mounting tab 362 and one or more base main bands (e.g., base main band 364). The base hinge flange 360 and the knuckle 354 can be considered the parts/components for a base hinge. As shown in the example of FIG. 3, the base main band 364 can have a geometry similar to a question mark. The base main band 364 is placed over/surrounds a portion of the first shaft 370. Rotation of the toggle pivot 352 rotates the first shaft 370 within the base main band 364. Though not shown in FIG. 3, another base main band, similar to the base main band 364, is coupled to the base mounting tab 362 (the view of the other base main band is obstructed by the lid mounting tab 314), and rotation of the toggle pivot 352 rotates the first shaft 370 within the main bands.

Each base main band is placed over/surrounds a portion of the first shaft 370. In the example shown in FIG. 3, similar to the lid main bands 316a-b, each of the base main bands can have a geometry similar to a question mark. The placement of the base main band 364 results in the question mark geometry being placed over/surrounding the second shaft 372 in a clockwise direction. Though not shown, the placement of the other base main band results in the question mark geometry being placed over/surrounding the second shaft 372 in a counterclockwise direction.

The base mounting tab 362 can be coupled to/connected to a base of a computing device (e.g., base 106 of computing device 102). In some cases, a torque applied to the lid of the computing device by a user of the computing device can cause the toggle pivot 352 to rotate allowing the first shaft 370 to rotate within the one or more base main bands (e.g., the base main band 364). The rotation of the toggle pivot 352 causes the lid of the computing device to rotate with respect to the base of the computing device (e.g., base 106 of computing device 102). The base hinge can be implemented as a friction hinge allowing movement and placement of the lid 104 in static positions between the 135-degree position and the 225-degree position.

The base hinge can be implemented using constant friction hinges (e.g., question mark style hinges) providing smooth movement of the hinges that translates to smooth movement of the lid 104. The constant friction hinges can be implemented to provide sufficient friction to allow the lid 104 to remain stable in positions between the 135-degree position and the 225-degree position. In some implementations, other types of constant friction hinges may be used (e.g., washer style constant friction hinges).

In the example shown in FIG. 3, the second lid main band 316b includes a tab 318. The tab 318 is placed in a detent 358 included in the knuckle 354 (included in the casing 356). For example, an edge 318a of the tab 318 can contact an edge 358a of the detent 358 when a lid of a computing device (the lid coupled to the lid mounting tab 314 (e.g., lid 104)) is substantially in contact with an upper surface of a base of a computing device (the base coupled to the base mounting tab 362 (e.g., upper surface 107a of base 106)). The computing device can be considered in a closed position, as shown in FIG. 1A and FIG. 6A. In the closed position, the lid of the computing device is considered to be at a zero degree angle with respect to the base of the computing device. The use of the tab 318 and the detent 358 can prevent any additional rotation of the main hinge 108 once the computing device is in the closed position.

In another example, an edge 318b of the tab 318 can contact an edge 358b of the detent 358 when a lid of a computing device (the lid coupled to the lid mounting tab 314 (e.g., lid 104)) is substantially in contact with a lower surface of a base of a computing device (the base coupled to the base mounting tab 362 (e.g., lower surface 107b of base 106)). The computing device can be considered to be in a fully open or tablet mode, as shown in FIG. 6F. In the tablet mode, the lid of the computing device is considered to be at a 360-degree angle with respect to the base of the computing device. The use of the tab 318 and the detent 358 can prevent any additional rotation of the main hinge 108 once the computing device is in the tablet mode.

Figure 4:
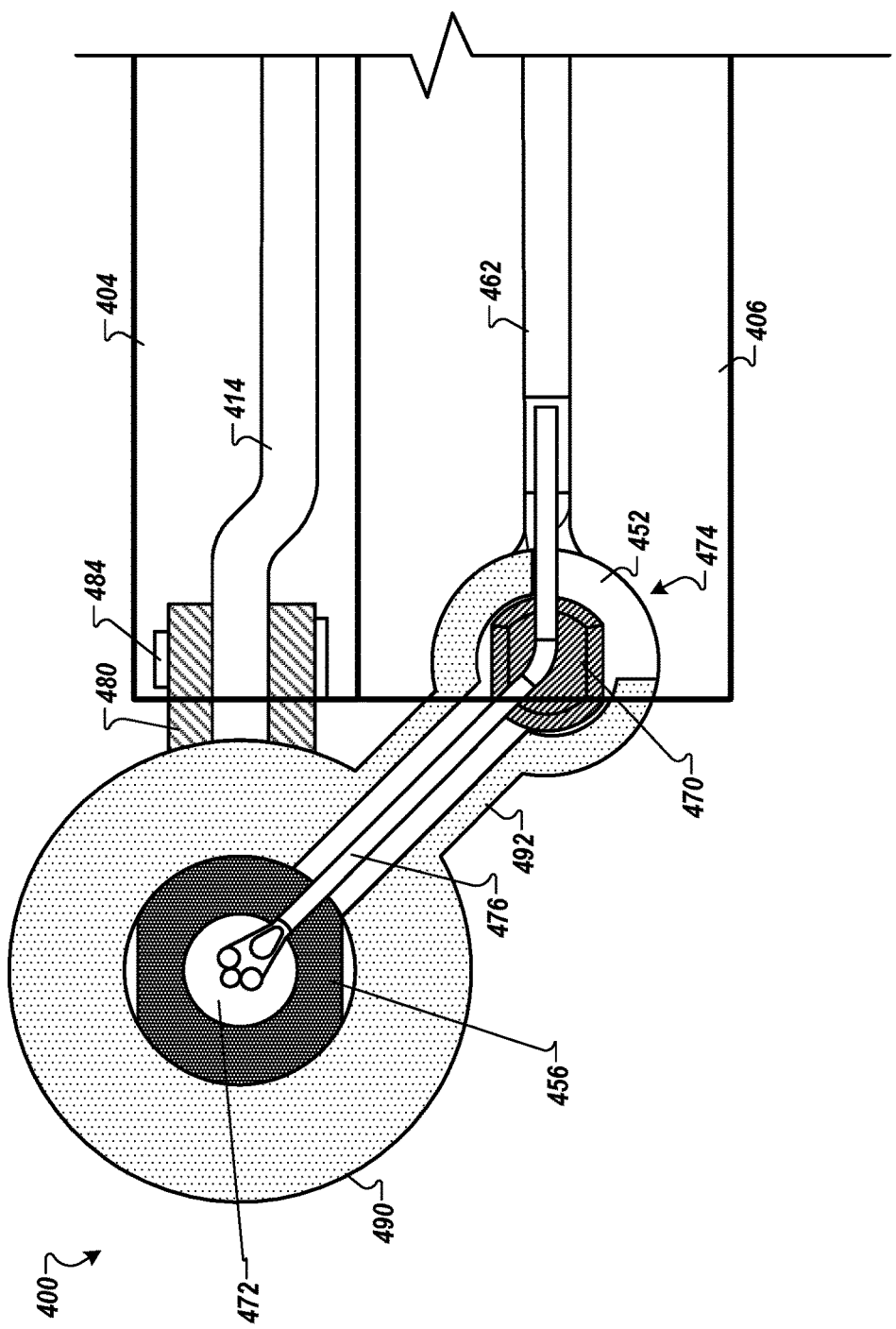
FIG. 4 is a cross-sectional side view of the example hinge assembly shown in FIG. 3.

FIG. 4 is a cross-sectional side view 400 of the example hinge assembly 300 shown in FIG. 3. For example, referring to FIG. 3, the cross-sectional side view can be at section A-A' as viewed looking towards the end nut 328 of the hinge assembly 300. The cross-sectional view shows a cross-sectional view of the housing 390 (housing cross section 490) and a cross-sectional view of the housing neck 392 (housing neck cross section 492). The cross-sectional view of the housing 390 includes a cross-sectional view of the second shaft 372 (second shaft cross section 472) and, looking down the housing 390, a side view of the casing 356 (casing side view 456). The cross-sectional side view 400 shows wires 476 running from a base 406 of a computing device (e.g., computing device 102 in FIG. 1A) through the housing neck 392 and into the second shaft 472.

Also included in the cross-sectional side view 400, is a side view of the lid mounting tab 314 (lid mounting tab side view 414). The lid mounting tab 314 can be coupled to a lid 404 of the computing device. The cross-sectional side view 400 includes a side view of the first cam 380 (first cam side view 480) including a side view of the rivet pin 384 (rivet pin side view 484). The cross-sectional side view 400 includes a side view of the first shaft 370 (first shaft side view 470) enclosed in the toggle pivot 352 as shown in the side view of the toggle pivot (toggle pivot side view 452). The cross-sectional side view 400 includes a side view of the base mounting tab 362 (base mounting tab side view 462). The base mounting tab 362 can be coupled to the base 406 of the computing device.

As shown in the cross-sectional side view 400 in FIG. 4, the housing neck 392 (housing neck cross section 492) includes an opening 474 (e.g. cable passageway 374). The opening 474 allows the wires 476 to run from the base 106 into the housing neck 392 (housing neck cross section 492) and into the second shaft 372 (second shaft cross section 472). In addition, the opening 474 enables the housing 390 (that includes the housing neck 392) to rotate when the base hinge flange 360 controls the rotation of the lid 404. This rotation will be described in more detail with reference to FIGS. 6A-F.

Figure 5:
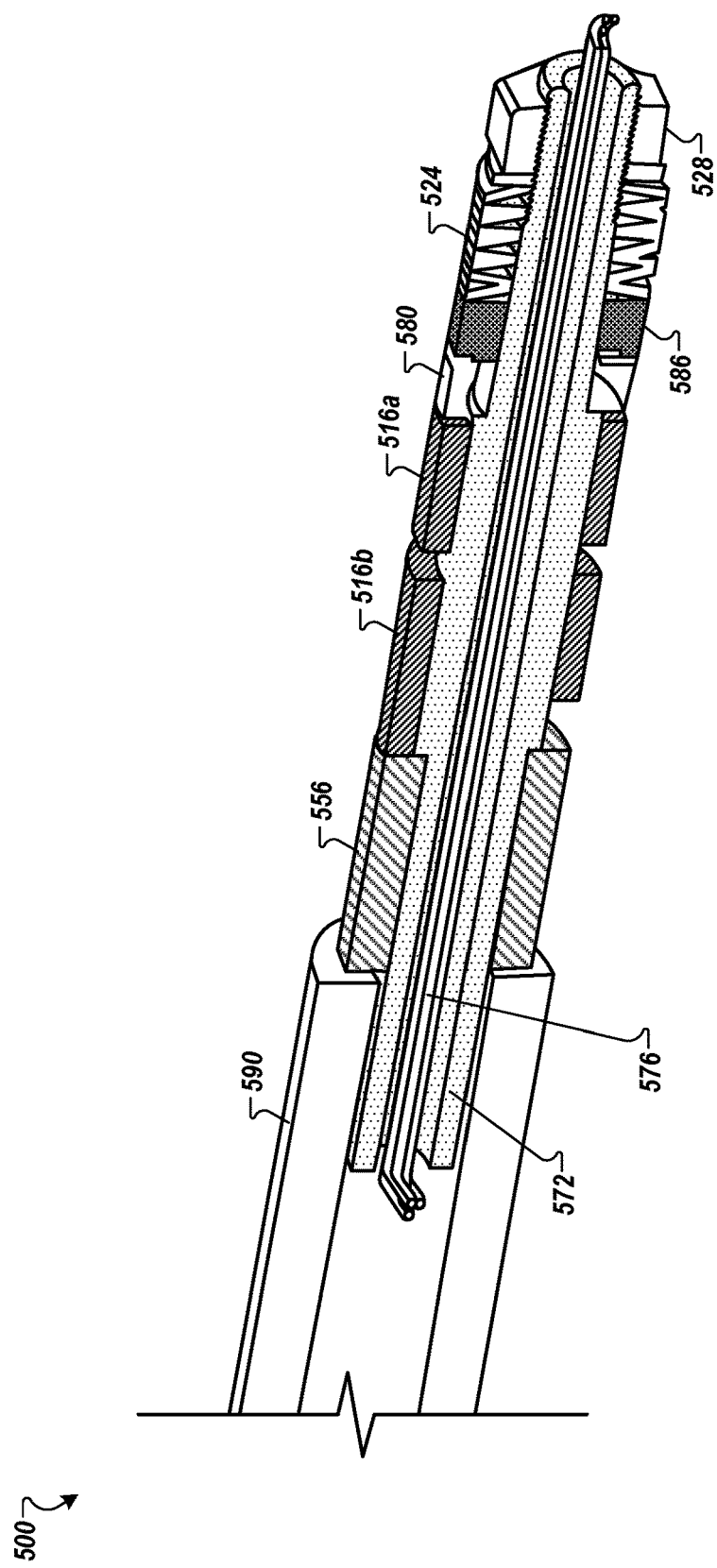
FIG. 5 is a cross-sectional view of the example main hinge assembly shown in FIG. 3 along a plane parallel to a rear/back of a computing device.

FIG. 5 is a cross-sectional view 500 of the main hinge 108 shown in FIG. 3. The cross-sectional view can be along a plane parallel to a rear/back of a computing device at section A-A" (e.g., referring to FIG. 2, the back 216 of the computing device 202 where the main hinge 108 is located on a right end of the computing device 202 and is concealed using the right end cover 292). The cross-sectional view 500 shows a cross-sectional view of the housing 390 (housing cross section 590) and a cross-sectional view of the second shaft 372 (second shaft cross section 572). The cross-sectional view 500 shows wires 576 running through the second shaft 472.

Also included in the cross-sectional view 500, is a cross-sectional view of the casing 356 (casing cross section 556); a cross-sectional view of the lid main bands 316a-b (first lid main band cross section 516a and second lid main band cross section 516b); a cross-sectional view of first cam 380 (first cam cross section 580); a cross-sectional view of the second cam 386 (second cam cross section 586); a cross-sectional view of the washer stack 324 (washer stack cross section 524); and a cross-sectional view of the end nut 328 (end nut cross section 528). As shown in FIG. 5, the second shaft 372 runs through/is surrounded at least in part by the housing 390, the casing 356, the lid main bands 316a-b, the cams 380, 386, the washer stack 324 and the end nut 328.

FIGS. 6A-F are diagrams that illustrate the example computing device 102 with the lid 104 placed at various angles with respect to the base 106 of the computing device 102. The diagrams illustrate the various lid positions from a side-view (the right side 146) of the computing device 102. As described with reference to FIGS. 1A-B, and FIG. 3, the dual pivot variable torque hinge 150 includes the main hinge 108, the toggle neck 110, and the lid hinge flange 112 that are completely or, at least partially visible outside of the lid 104 and the base 106 of the computing device 102. Though not shown, the computing device 102 can include a second dual pivot variable torque hinge that includes similar parts. Reference to the dual pivot variable torque hinge 150 can also refer to the pair of dual pivot variable torque hinges.

The use of the dual pivot variable torque hinges enable the lid 104 to rotate about the hinges and relative to the base 106. The dual pivot variable torque hinges allow the lid 104 to rotate about the base 106, while constraining the rotational motion to prevent the lid 104 from slipping away from the base 106. In addition, the hinges enable the lid 104 to remain in a static position once the rotational motion stops.

The rotational motion allows a user of the computing device 102 to move the lid 104 to multiple positions, as shown in FIGS. 6A-F. For example, the lid 204 can include a display area that can provide visual output to the user. For example, the display area can include a liquid crystal display (LCD), a plasma display, or a light-emitting diode (LED) display. The display area can also receive input from a user, for example as in a case where the display area includes a touchscreen device. The lid may also include a camera sensor, a touch sensor, or an ambient light sensor.

The base 206 can include one or more input devices such as a keyboard, a pointing stick, mouse buttons, a touchpad, and/or a trackpad. The multiple positions allow a user to change the viewing angle of the display area relative to the base 206 while the base 206 remains stationary. The user can place the computing device 202 into a configuration that allows the user to interact in a preferred way with the computing device 202.

FIG. 6A is a diagram that illustrates the example computing device 102 in a closed position from a side-view (the right side 146) where the lid 104 is substantially in contact with the upper surface 107a of the base 106. In the closed position, the lid 104 can be considered at a zero-degree angle with respect to the base 106. Also in the closed position, a torque associated with the main hinge 108 (a main hinge torque) is less than a torque associated with the base hinge (a base hinge torque).

Figure 6B:
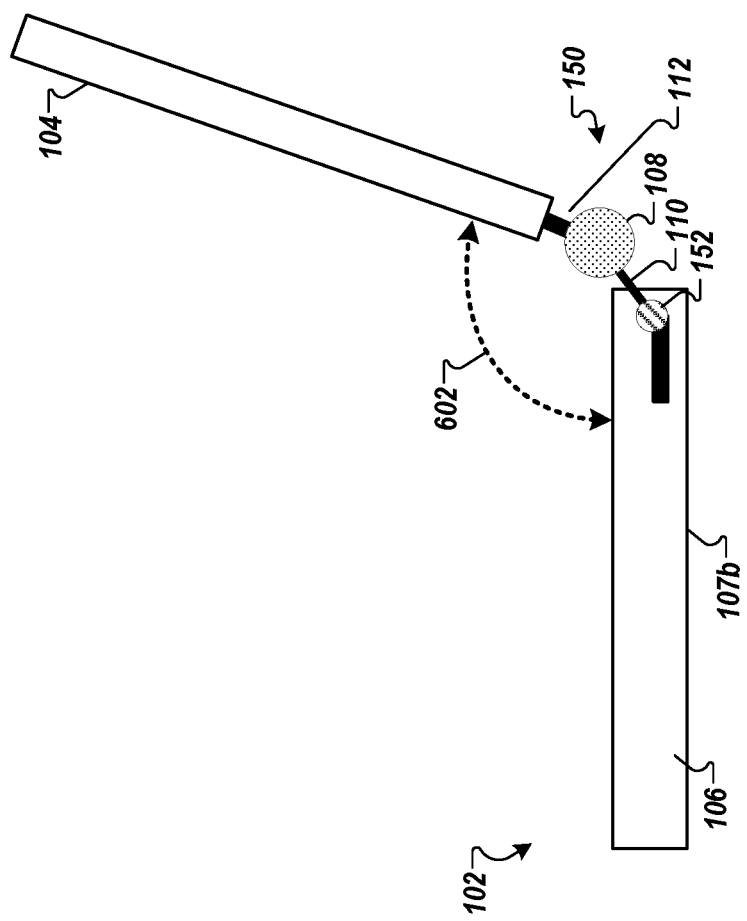

FIG. 6B illustrates an example configuration of the computing device 102 where the lid 104 is rotated about the main hinge 108 of the dual pivot variable torque hinge 150 and placed in a 120-degree position. In the 120-degree position, the lid 104 is at an angle 602 that is approximately 120-degrees (i.e., 120 degrees±5 degrees) with respect to the base 106, which remains stationary. In the 120-degree position, for example, the user can interact with the one or more input devices included in the base 106 while viewing a display included in the lid 104. In some cases, the placement of the lid 104 in this position can be a factor of the type of computing device. For example, a user using a laptop computer may place the lid 104 at greater than the 120-degree angle with respect to the base 106. A user of a notebook or other computing device that is smaller than the laptop computer may place the lid 104 at an angle less than the 120-degree angle with respect to the base 106.

Movement of the lid from the closed position shown in FIG. 6A to the 120-degree position shown in FIG. 6B is accomplished by the rotational movement of the main hinge 108 as a user applies a force to the lid 104, pushing it up and away from the base 106. The rotational movement of the main hinge 108 provides/controls the movement of the lid 104 while the base hinge remains stationary (it does not rotate). This occurs because from the closed position up to the 120-degree position, the main hinge torque is less than the base hinge torque.

Figure 6C:
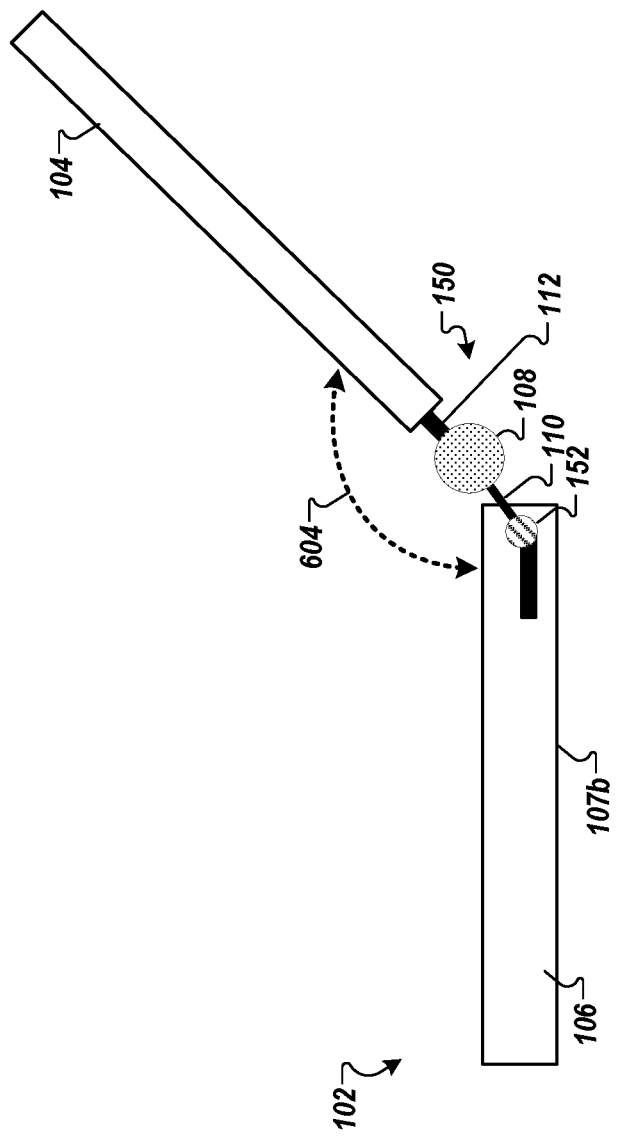

FIG. 6C illustrates an example configuration of the computing device 102 where the lid 104 is rotated about the main hinge 108 of the dual pivot variable torque hinge 150 and placed in a 135-degree position. In the 135-degree position, the lid 104 is at an angle 604 that is approximately 135-degrees (i.e., 135 degrees±5 degrees) with respect to the base 106, which remains stationary. In the 135-degree position, for example, the user can interact with the computing device in a manner similar to when the lid 104 of the computing device 102 is in the 120-degree position.

Movement of the lid from the closed position shown in FIG. 6A, through the 120-degree position shown in FIG. 6B, and to the 135-degree position shown in FIG. 6B is accomplished by the rotational movement of the main hinge 108 as a user applies a force/torque to the lid 104, moving the lid 104 further away from the base 106. The torque is provided against the resistance of the washer stack 324. The rotational movement of the main hinge 108 provides/controls the movement of the lid 104 while the base hinge remains stationary (does not rotate). This occurs because from the closed position up to and including the 135-degree position, the main hinge torque is less than the base hinge torque.

Figure 6D:
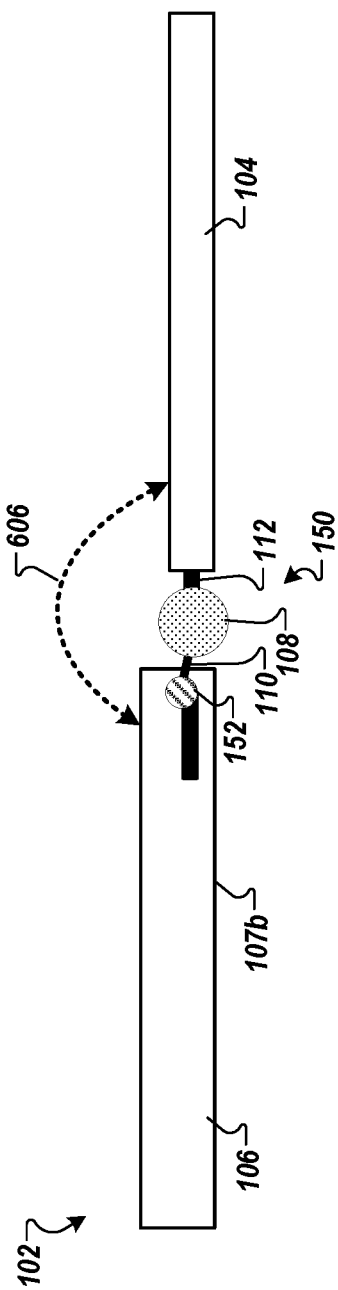

FIG. 6D illustrates an example configuration of the computing device 102 where the lid 104 is rotated about dual pivot variable torque hinges (e.g., dual pivot variable torque hinge 150) from the zero-degree position to a 180-degree position. In the 180-degree position, the lid 104 is at an angle 606 that is approximately 180-degrees (i.e., 180 degrees±5 degrees) with respect to the base 106.

Movement of the lid 104 from the closed position (as shown in FIG. 6A) to the 180-degree position is accomplished by the rotational movement of the main hinge 108, when moving the lid 104 from the closed position to the 135-degree position, and then by the rotational movement of the base hinge, when moving the lid 104 further from the 135-degree position to the 180-degree position. This occurs because from the closed position up to and including the 135-degree position, the main hinge torque is less than the base hinge torque. Continuing from the 135-degree up to the 180-degree position, the base hinge torque is less than the main hinge torque (the main hinge torque is greater that the base hinge torque). Therefore, the base hinge takes over the movement of the lid 104 and the main hinge 108 remains stationary (does not rotate).

Figure 6E:
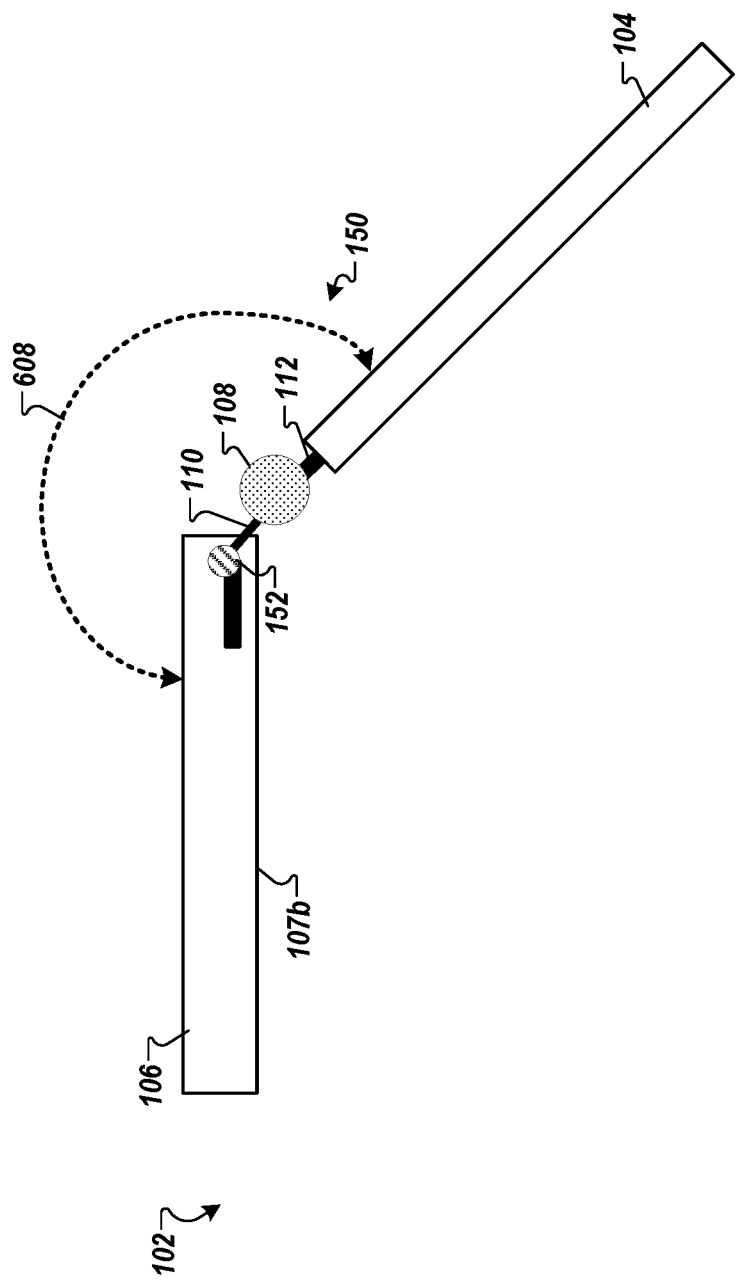
Figure 6F:
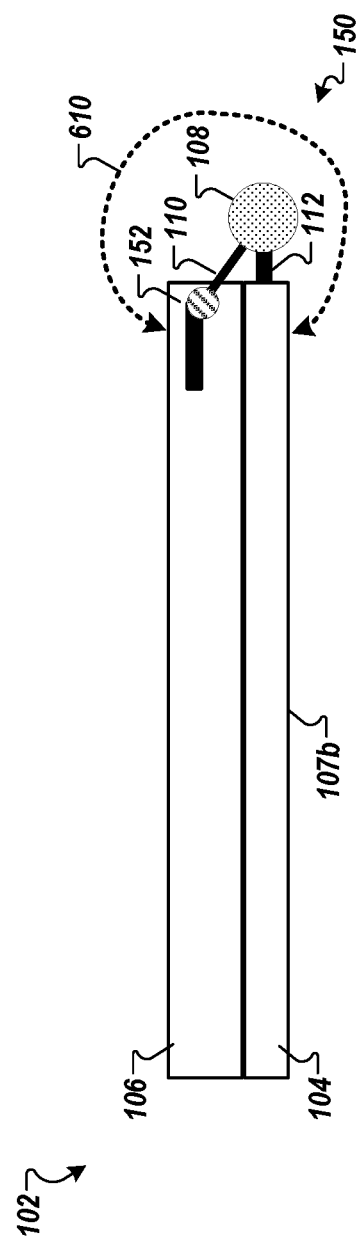

FIG. 6E illustrates an example configuration of the computing device 102 where the lid 104 is rotated about dual pivot variable torque hinges (e.g., dual pivot variable torque hinge 150) from the zero-degree position to a 225-degree position. In the 225-degree position, the lid 104 is at an angle 608 that is approximately 225-degrees (i.e., 225 degrees±5 degrees) with respect to the base 106.

Movement of the lid 104 from the closed position (as shown in FIG. 6A) to the 225-degree position is accomplished by the rotational movement of the main hinge 108, when moving the lid 104 from the closed position to the 135-degree position, and then by the rotational movement of the base hinge, when moving the lid 104 further from the 135-degree position to the 225-degree position. This occurs because from the closed position up to and including the 135-degree position, the main hinge torque is less than the base hinge torque. Continuing from the 135-degree up to and including the 225-degree position, the base hinge torque is less than the main hinge torque (the main hinge torque is greater that the base hinge torque). Therefore, the base hinge takes over the movement of the lid 104 and the main hinge 108 remains stationary (does not rotate).

FIG. 6F illustrates an example configuration of the computing device 102 where the lid 104 is rotated about dual pivot variable torque hinges (e.g., dual pivot variable torque hinge 150) from the zero-degree position to a 360-degree position. In the 360-degree position, the lid 104 is at an angle 610 that is approximately 360-degrees (i.e., 360 degrees±5 degrees) with respect to the base 106. In this 360-degree position, the lid 104 is in contact with a lower surface 107b of the base 106.

Movement of the lid 104 from the closed position (as shown in FIG. 6A) to the 360-degree position is accomplished by the rotational movement of the main hinge 108, when moving the lid 104 from the closed position to the 135-degree position, by the rotational movement of the base hinge, when moving the lid 104 from the 135-degree position to the 225-degree position, and then by the rotational movement of the main hinge 108, when moving the lid 104 from the 225-degree position to the 360-degree position. This occurs because from the closed position up to the 135-degree position, the main hinge torque is less than the base hinge torque, from the 135-degree position up to the 225-degree position, the main hinge torque is greater than the base hinge torque, and from the 225-degree position up to the 360-degree position the main hinge torque is less than the base hinge torque.

In order for the base hinge to continue the movement of the lid 104 when the lid 104 is moved/pushed beyond the 135-degree position, the main hinge torque is increased by an incremental amount when the lid 104 is placed at the 135-degree position. Referring to FIG. 3, the rotation of the main bands 316*a-b* (specifically the second lid main band 316*b*) and the first cam 380 about the second shaft 372 can rotate/move the lid from the closed position up to the 135-degree position. As the 135-degree position is approached from the closed position, the first cam 380 and the second cam 386 push apart from one another, further compressing the washer stack 324, resulting in the creation of additional friction, thus increasing the torque of the main hinge 108. At the 135-degree position, the incremental increase to the main hinge torque results in the main hinge torque being greater than the base hinge torque. Subsequent movement of the lid beyond the 135-degree position and up to the 225-degree position (90 degrees of angular movement of the lid 104 relative to the base 106) is performed by the rotation of the base hinge.

In the 135-degree position, the lid 104 can be considered in a locked position or a position maintained by the main hinge 108 because the base hinge performs further movement of the lid 104, while the main hinge 108 remains stationary. The base hinge moves/rotates the locked combination of the lid 104 and the main hinge 108 for the next 90 degrees of rotation (up to the 225-degree position of the lid 104 as shown in FIG. 6E). The movement of the locked combination of the lid 104 and the main hinge 108 effectively swings the combination of the lid 104 and the main hinge 108 around the rear of the computing device such that the location of the main hinge 108 moves from being located above the base 106 to being located below the base 106. This movement allows the lid 104 to be further moved/rotated to the 360-degree position, where the lid 104 is in contact with a lower surface 107*b* of the base 106. In some implementations, when the lid 104 is rotated to the 135-degree position, the lid hinge flange 112 can be in-line with the toggle neck 110.

When the lid 104 is moved/pushed beyond the 225-degree position and towards the 360-degree position, the main hinge torque is decreased by an incremental amount when the lid 104 is placed at the 225-degree position. Referring to FIG. 3, at the 225-degree position, further movement of the lid 104 causes the rotation of the main bands 316*a-b* (specifically the second lid main band 316*b*) and the first cam 380 about the second shaft 372 causing the first cam 380 and the second cam 386 to move towards one another, reducing the compression of the washer stack 324, resulting in a reduction in the friction, thus decreasing the torque of the main hinge 108. At the 225-degree position, the incremental decrease to the main hinge torque results in the main hinge torque being less than the base hinge torque. Subsequent movement of the lid beyond the 225-degree position and up to the 360-degree position is performed by the rotation of the main hinge 108.

The design/implementation of the washer stack 324 (e.g., the type of washer used, the number of washers used) is determined based on a calculated amount of additional torque needed by the main hinge 108 to maintain the lid 104 in the 135-degree position while the base hinge performs the next 90 degrees of rotation of the locked combination of the lid 104 and the main hinge 108. In addition, the calculated amount of additional torque results in the main hinge torque being greater that the base hinge torque when the lid 104 is placed at angles with respect to the base 106 that are between 135-degrees (i.e., 135 degrees±5 degrees) and 225-degrees (i.e., 225 degrees±5 degrees).

The use of dual pivot variable torque hinges enables a user of a computing device (e.g., the computing device 102) to apply a nearly constant torque to the lid (e.g., the lid 104) of the computing device when moving/rotating the lid to any position between a closed position and the 360-degree position. The applied torque overcomes the friction (resistance) of the main hinge 108 or the base hinge, dependent on the position of the lid 104.

In addition, the lid 104 may be placed in static positions in between those shown in FIG. 6A and FIG. 6F (the lid 104 may be placed at angles between the closed position and the 360-degree position with respect to the base 106).

FIG. 7 is a flowchart that illustrates an example method 700 for connecting a lid of a computing device to a base of a computing device using a dual pivot variable torque hinge. According to this example, the method 700 includes coupling a base hinge flange to the base, the base hinge flange being connected to a base hinge part that includes a knuckle including a toggle pivot, the toggle pivot coupled to and surrounding a first portion of a first shaft (702). The method also includes coupling a lid hinge flange to the lid, the lid hinge flange being connected to a main hinge part that includes a first cam, the lid hinge flange including a first lid main band and a second lid main band surrounding a first portion of a second shaft, the second shaft being parallel to the first shaft (704).

Though the implementations herein are described with respect to a user rotating a lid of a computing device from a closed position to a 360-degree position, they can also be applied to a user rotating a lid from the 360-degree position to the closed position. In this case, referring to FIG. 3 and FIG. 6C, when rotating the lid 104 through the 225-degree position from a position greater than 225 degrees to a position less than 225 degrees, the rotation of the main bands 316*a-b* (specifically the first lid main band 316*a*) and the first cam 380 about the second shaft 372 can rotate/move the lid from the 360-degree position up to the 225-degree position. As the 225-degree position is approached from the 360-degree position, the first cam 380 and the second cam 386 push apart from one another, further compressing the washer stack 324, resulting in the creation of additional friction, thus increasing the torque of the main hinge 108. At the 225-degree position, the incremental increase to the main hinge torque results in the main hinge torque being greater than the base hinge torque. Subsequent movement of the lid beyond the 225-degree position and up to the 135-degree position (90 degrees of angular movement of the lid 104 relative to the base 106) is performed by the rotation of the base hinge.

When the lid 104 is moved/pushed beyond the 135-degree position and towards the closed position, the main hinge torque is decreased by the incremental amount. Referring to FIG. 3, at the 135-degree position, further movement of the lid 104 towards the closed position causes the rotation of the main bands 316*a-b* (specifically the first lid main band 316*a*) and the first cam 380 about the second shaft 372 causing the first cam 380 and the second cam 386 to move towards one another, reducing the compression of the washer stack 324, resulting in a reduction in the friction, thus decreasing the torque of the main hinge 108. At the 135-degree position, the incremental decrease to the main hinge torque results in the main hinge torque being less than the base hinge torque. Subsequent movement of the lid beyond the 135-degree position and to the closed position is performed by the rotation of the main hinge 108.

A number of embodiments have been described. Nevertheless, it will be understood that various modifications may be made without departing from the spirit and scope of the disclosure.

In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other embodiments are within the scope of the following claims.

While certain features of the described implementations have been illustrated as described herein, many modifications, substitutions, changes and equivalents will now occur to those skilled in the art. It is, therefore, to be understood that the appended claims are intended to cover all such modifications and changes as fall within the scope of the implementations. It should be understood that they have been presented by way of example only, not limitation, and various changes in form and details may be made. Any portion of the apparatus and/or methods described herein may be combined in any combination, except mutually exclusive combinations. The implementations described herein can include various combinations and/or sub-combinations of the functions, components and/or features of the different implementations described.

What is claimed is:

1. A computing device comprising:
    a lid; and
    a base coupled to the lid by a hinge, the hinge including:
        a first shaft including a first portion and a second portion;
        a second shaft parallel to the first shaft, the second shaft including a first portion, a second portion, and a third portion, the second portion of the second shaft being located between the first portion of the second shaft and the third portion of the second shaft;
        a base hinge part including a base hinge flange and a knuckle including a toggle pivot, the toggle pivot coupled to and surrounding the first portion of the first shaft; and
        a main hinge part including a first cam, a second cam, and a lid hinge flange including a first lid main band and a second lid main band surrounding the first portion of the second shaft,
            wherein the first cam surrounds the second portion of the second shaft,
            wherein the second cam surrounds the third portion of the second shaft, and
            wherein the base hinge flange includes a first base main band and a second base main band surrounding the second portion of the first shaft.

2. The computing device of claim 1,
    wherein the base hinge flange is connected to the base, and
    wherein the lid hinge flange is connected to the lid.

3. The computing device of claim 1,
    wherein the first lid main band, the second main lid band, and the first cam are configured to rotate about the second shaft causing the lid to rotate relative to the base, the rotation being from a first position to a second position, and the rotation being from a third position to a fourth position.

4. The computing device of claim 3,
    wherein the first base main band and the second base main band are configured to rotate about the first shaft causing the lid to rotate relative to the base, the rotation being from the second position to the third position.

5. The computing device of claim 4, wherein a torque applied to the lid by the main hinge part when the lid is rotated from the first position to the second position and when the lid is rotated from the third position to the fourth position is substantially the same as a torque applied to the lid by the base hinge part when the lid is rotated from second position to the third position.

6. The computing device of claim 4, further comprising:
    a washer stack,
        wherein the second cam is located between the washer stack and the first cam, and wherein the first cam is pushed away from the second cam when the lid is in the second position, the pushing compressing the washer stack.

7. The computing device of claim 6, wherein a main hinge torque is associated with the main hinge part and a base hinge torque is associated with the base hinge part, and wherein compressing the washer stack increases the main hinge torque.

8. The computing device of claim 6, wherein the washer stack includes a plurality of friction washers surrounding the second shaft and configured as a stack.

9. The computing device of claim 6, wherein the main hinge part further includes an end nut that surrounds a fourth portion of the second shaft, the fourth portion being located at an end of the second shaft, the end nut retaining the washer stack on the second shaft.

10. The computing device of claim 1, wherein a main hinge torque is associated with the main hinge part and a base hinge torque is associated with the base hinge part.

11. The computing device of claim 10, wherein the main hinge torque is less than the base hinge torque when a lid rotation is from a first position to a second position and from a third position to a fourth position.

12. The computing device of claim 11, wherein the main hinge torque is greater than the base hinge torque when the lid rotation is from the second position to the third position.

13. The computing device of claim 1,
    wherein the second shaft is hollow,
    wherein the computing device further comprises a plurality of wires that pass through the second shaft, and
    wherein the plurality of wires connect a first electrical component in the base of the computing device to a second electrical component in the lid of the computing device.

14. The computing device of claim 1, wherein the hinge is coupled to the base such that the base hinge part is located within a recess included in the base, and the main hinge part is located outside of the base, and horizontally offset from the base hinge part.

15. A method of coupling a base to a lid of a computing device using a hinge, the method comprising:
    coupling a base hinge flange to the base, the base hinge flange being connected to a base hinge part that includes a knuckle including a toggle pivot, the toggle pivot coupled to and surrounding a first portion of a first shaft; and
    coupling a lid hinge flange to the lid, the lid hinge flange being connected to a main hinge part that includes a cam, the lid hinge flange including a first lid main band and a second lid main band surrounding a first portion of a second shaft, the second shaft being parallel to the first shaft; and wherein the cam surrounds a second portion of the second shaft, the second portion of the second shaft being located adjacent to the first portion of the second shaft, and wherein the base hinge flange includes a first base main band and a second base main band surrounding a second portion of the first shaft.

16. The method of claim 15, wherein rotating the main hinge part causes the first lid main band, the second main lid band, and the cam to rotate about the second shaft causing the lid to rotate relative to the base, the rotation being from a first position to a second position, and the rotation being from a third position to a fourth position.

17. The method of claim 16, wherein rotating the base hinge part causes the toggle pivot to rotate causing the first base main band and a second base main band to rotate about the first shaft causing the lid to rotate relative to the base, the rotation being from the second position to the third position.

18. A computing device comprising:
a lid; and
a base coupled to the lid by a dual pivot hinge, the dual pivot hinge including:
a first pivot structure coupled to the lid and comprising a first pivot point; and
a second pivot structure coupled to the base and comprising a second pivot point,
wherein the second pivot structure is located within a recess included in the base, and
wherein the entire first pivot structure is horizontally offset from the second pivot structure, is located outside of the lid, and is located outside of the recess.

19. The computing device of claim 18, wherein the first pivot structure includes a friction element different from a friction element included in the second pivot structure.

20. The computing device of claim 18,
wherein a diameter of the first pivot structure is different from a diameter of the second pivot structure.

21. The computing device of claim 20, wherein a diameter of the second pivot structure is less than a diameter of the first pivot structure.

22. The computing device of claim 18, wherein the dual pivot hinge sequences a rotation of the first pivot structure and the second pivot structure when the lid is rotated relative to the base.

* * * * *